US012795597B2

(12) United States Patent
Khirallah et al.

(10) Patent No.: US 12,795,597 B2
(45) Date of Patent: Nov. 10, 2026

(54) APPARATUS AND METHOD FOR PROVIDING UE LOCATION INFORMATION

(71) Applicant: Samsung Electronics Co., Ltd., Gyeonggi-do (KR)

(72) Inventors: Chadi Khirallah, Middlesex (GB); David Gutierrez Estevez, Middlesex (GB)

(73) Assignee: Samsung Electronics Co., Ltd (KR)

( * ) Notice: Subject to any disclaimer, the term of this patent is extended or adjusted under 35 U.S.C. 154(b) by 583 days.

(21) Appl. No.: 17/967,076

(22) Filed: Oct. 17, 2022

(65) Prior Publication Data

US 2023/0124118 A1 Apr. 20, 2023

(30) Foreign Application Priority Data

Oct. 15, 2021 (GB) ..................................... 2114804
Mar. 29, 2022 (GB) ..................................... 2204489

(51) Int. Cl.
*H04W 64/00* (2009.01)
*H04W 4/029* (2018.01)
*H04W 8/02* (2009.01)

(52) U.S. Cl.
CPC ......... *H04W 64/006* (2013.01); *H04W 4/029* (2018.02); *H04W 8/02* (2013.01)

(58) Field of Classification Search
CPC ..... H04W 64/006; H04W 4/029; H04W 8/02; H04W 64/00; H04W 4/02; H04W 48/18
See application file for complete search history.

(56) References Cited

U.S. PATENT DOCUMENTS 11,310,731 B1 * 4/2022 Feder ...................... H04W 8/08
12,052,570 B2 * 7/2024 Fan ...................... H04W 12/12
2013/0337834 A1 12/2013 Alpert et al.
(Continued)

FOREIGN PATENT DOCUMENTS

WO WO-2019240550 A1 * 12/2019 ............. H04W 4/70
WO 2020/093076 5/2020
WO WO 2020/183254 9/2020

OTHER PUBLICATIONS

International Search Report dated Jan. 12, 2023 issued in counterpart application No. PCT/KR2022/015578, 8 pages.
(Continued)

*Primary Examiner* — Jeanette J Parker
*Assistant Examiner* — Michelle C Douglas
(74) *Attorney, Agent, or Firm* — The Farrell Law Firm, P.C.

(57) ABSTRACT

A method, related to a 5G or 6G communication system for supporting a higher data transmission rate is provided, the method verifies, is provided for verifying location information of a user equipment (UE) in a network that includes the UE and one or more network entities. The method includes receiving, by a first network entity, first information indicating a location of the UE as determined by the UE; receiving, by the first network entity, second information for verifying the first information; and verifying the first information based on the second information. The second information includes at least one of CN assistance information; and information determined based on network analytics. Additionally or alternatively, the second information may include additional information provided by the UE.

4 Claims, 8 Drawing Sheets

(56) References Cited

U.S. PATENT DOCUMENTS

| | | | | |
|---|---|---|---|---|
| 2019/0007788 | A1 | 1/2019 | Russell | |
| 2019/0349849 | A1* | 11/2019 | Kavuri | H04W 8/18 |
| 2019/0380128 | A1* | 12/2019 | Park | H04W 72/21 |
| 2019/0394713 | A1 | 12/2019 | Zheng et al. | |
| 2020/0112907 | A1 | 4/2020 | Dao et al. | |
| 2021/0092609 | A1* | 3/2021 | Wang | H04W 4/70 |
| 2021/0274392 | A1* | 9/2021 | Dao | H04W 36/0033 |
| 2021/0360371 | A1* | 11/2021 | Qiao | H04W 4/029 |
| 2022/0046424 | A1* | 2/2022 | Edge | H04W 12/63 |
| 2022/0046578 | A1* | 2/2022 | Edge | H04B 7/18545 |
| 2022/0094430 | A1* | 3/2022 | Edge | H04B 7/1851 |
| 2023/0189132 | A1* | 6/2023 | Kim | H04W 60/00 455/435.1 |
| 2023/0366976 | A1* | 11/2023 | Manolakos | G01S 5/0236 |
| 2023/0370834 | A1* | 11/2023 | Xu | H04W 4/029 |
| 2024/0246440 | A1* | 7/2024 | Salter | B60L 53/63 |
| 2024/0427484 | A1* | 12/2024 | Daub | G06Q 50/01 |
| 2025/0009135 | A1* | 1/2025 | Outhwaite | H05B 3/286 |

OTHER PUBLICATIONS

3GPP TS 23.288 V17.2.0 (Sep. 2021) Technical Specification 3rd Generation Partnership Project; Technical Specification Group Services and System Aspects; Architecture enhancements for 5G System (5GS) to support network data analytics services (Release 17), pp. 196.

3GPP TS 23.501 V17.2.0 (Sep. 2021) Techical Specification 3rd Generation Partnership Project; Technical Specification Group Services and System Aspects; System architecture for the 5G System (5GS); Stage 2 (Release 17), pp. 542.

3GPP TS 38.215 V17.2.0 (Sep. 2022) Technical Specification 3rd Generation Partnership Project; Technical Specification Group Radio Access Network; NR; Physical layer measurements (Release 17), pp. 26.

3GPP TR 23.700-71 V0.2.0 (Apr. 2022) Technical Report 3rd Generation Partnership Project; Technical Specification Group Services and System Aspects; Study on enhancement to the 5GC LoCation Services (LCS); Phase 3 (Release 18), pp. 68.

3GPP TS 23.273 V17.6.0 (Sep. 2022) Technical Specification 3rd Generation Partnership Project; Technical Specification Group Services and System Aspects; 5G System (5GS) Location Services (LCS); Stage 2 (Release 17), pp. 108.

Thales, 3GPP TSG RAN Meeting #95e, RP-220953, Electronic Meeting, Mar. 17-23, 2022, NR NTN (Non-Terrestrial Networks) enhancements, pp. 8.

Network verified UE location—information workshop, Apr. 13, 2022, pp. 3.

Samsung, 3GPP SA WG2 Meeting #150E S2-2202181, Apr. 6-12, 2022, Elbonia, KI#9, 4: New Solution on Location Verification for Satellite Access assisted by NWDAF analytics, pp. 4.

3GPP TS 22.261 V19.0.0 (Sep. 2022) Technical Specification 3rd Generation Partnership Project; Technical Specification Group Services and System Aspects; Service requirements for the 5G system; Stage 1 (Release 19), pp. 114.

Combined Search and Examination Report dated Jun. 20, 2022, corresponding to counterpart application GB2114804.4, pp. 14.

Qualcomm Inc. SA WB2 Meeting #129bis S2-1812267, Nov. 26-30, 2018, West Palm Beach, USA, Evaluation and Conclusion for Key issue 13 about RAN related parameters, pp. 5.

3GPP TS 23.501 V17.1.0 (Jun. 2021) Technical Specification 3rd Generation Partnership Project; Technical Specification Group Services and System Aspects; System architecture for the 5G System (5GS); Stage 2 (Release 17), pp. 526.

British Search Report dated Mar. 30, 2023 issued in counterpart application No. 2204489.5, 8 pages.

European Search Report dated Oct. 4, 2024 issued in counterpart application No. 22881395.2-1215, 9 pages.

European Search Report dated Jan. 7, 2025 issued in counterpart application No. 22881395.2-1215, 15 pages.

* cited by examiner

FIG.4
NG-RAN node
AMF
INITIAL UE MESSAGE
Location Verify Request IE

APPARATUS AND METHOD FOR PROVIDING UE LOCATION INFORMATION

CROSS REFERENCE TO RELATED APPLICATION(S)

This application is based on and claims priority under 35 U.S.C. § 119 to Great Britain Patent Applications Nos. 2114804.4 and 2204489.5, filed on Oct. 15, 2021, and Mar. 29, 2022, respectively, the entire disclosure of each of which is incorporated herein by reference.

BACKGROUND

1. Field

The disclosure relates generally to an apparatus and system for providing more trusted and/or reliable user equipment (UE) location information in a 3rd generation partnership project (3GPP) 5th generation (5G) non-terrestrial network (NTN).

2. Related Art 5G mobile communication technologies define broad frequency bands such that high transmission rates and new services are possible, and can be implemented not only in sub 6 GHz bands such as 3.5 GHz, but also in above 6 GHz bands referred to as mmWave including 28 GHz and 39 GHz. In addition, it has been considered to implement $6^{th}$ generation (6G) mobile communication technologies (referred to as beyond 5G systems) in terahertz (THz) bands (e.g., 95 GHz to 3 THz bands) in order to achieve transmission rates that are fifty times faster than 5G mobile communication technologies and ultra-low latencies that are one-tenth of 5G mobile communication technologies.

Since the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple-input and multiple-output (MIMO) for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of a bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

Currently, there are ongoing discussions regarding improvement and performance enhancement of the initial 5G mobile communication technologies in view of services to be supported by future 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U), which is aimed at system operations conforming to various regulation-related requirements in unlicensed bands, NR UE power saving, NTN, which is UE-satellite direct communication for providing coverage in an area in which communication with terrestrial networks is unavailable, and positioning.

There has also been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (e.g., service based architecture or service based interface) for combining network functions virtualization (NFV) and software-defined networking (SDN) technologies, and mobile edge computing (MEC) for receiving services based on UE positions.

As 5G mobile communication systems are commercialized, the number of connected devices that have been exponentially increasing will be connected to communication networks. Accordingly, it is expected that enhanced functions and performances of 5G mobile communication systems and integrated operations of connected devices will be necessary. To this end, new research is scheduled in connection with extended Reality (XR) for efficiently supporting augmented reality (AR), virtual reality (VR), mixed reality (MR), etc., 5G performance improvement and complexity reduction by utilizing artificial intelligence (AI) and machine learning (ML), AI service support, metaverse service support, and drone communication.

Further, such development of 5G mobile communication systems will serve as a basis for developing new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), as well as full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

One of the areas currently under development in 3GPP 5G wireless technology is support for NTNs. An NTN is a network in which one or more nodes (e.g., next generation RAN (NG-RAN node)) are provided by a non-terrestrial infrastructure, for example a satellite or high altitude platform station (HAPS). Advantages of using an NTN include (i) extending coverage to regions, such as remote areas, with limited or no coverage from more traditional terrestrial networks, (ii) providing continuous coverage in the event of inoperability of traditional terrestrial networks, such as during natural disasters, and (iii) enhancing overall reliability, resilience and capacity when used in conjunction with existing terrestrial networks.

A satellite network implementing a network node (e.g., a NG-RAN node) provides coverage through one or more radio beams forming a footprint on the surface of the Earth, defining a coverage area or cell. An NTN cell may be Earth-moving (i.e., moving over the Earth's surface according to the motion of the satellite) or Earth-fixed (i.e., a fixed area of the Earth's surface, for example in the case of a geosynchronous equatorial orbit (GEO) satellite). An NTN cell may have a size in a range between tens to thousands of kilometers, and may cover multiple geographical regions (e.g., countries). In this case, a UE may be able to move between different geographical locations within the same cell. The node may need to select an access and mobility management function (AMF) of a core network (CN) that could serve the UE in its geographical location.

FIG. 1 illustrates a simplified NTN. In particular, FIG. 1 illustrates an NTN NG-RAN node implemented as a satellite with a beam having a footprint defining an NTN cell covering three countries (A, B and C). The NG-RAN node is connected to three AMF/CN (A, B, and C) that serve UEs located in respective countries (A, B, and C). A UE is illustrated in FIG. 1 as being located in country B, and therefore, the NG-RAN should select AMF/CN B to serve the UE.

The NG-RAN node needs the UE location in order to perform CN selection.

A network data analytics function (NWDAF) represents an (operator-managed) network analytics logical function providing slice specific network data analytics to network functions (NFs) and/or application functions (AFs). An NF or AF may subscribe to network analytics provided by the NWDAF. The NWDAF collects data from the NFs, the AFs and/or the OAM, and derives the network analytics. The NWDAF provides suitable network analytics to subscribed NFs and/or AFs, e.g., based on triggering events.

3GPP TS 23.501 V17.2.0, Clause 6.2.18, provides:

The Network Data Analytics Function (NWDAF) includes one or more of the following functionalities:

Support data collection from NFs and AFs;

Support data collection from OAM;

NWDAF service registration and metadata exposure to NFs and AFs;

Support analytics information provisioning to NFs and AFs;

Support Machine Learning (ML) model training and provisioning to NWDAFs (containing Analytics logical function).

The details of the NWDAF functionality are defined in TS 23.288 [86].

Clause 4.1 of 3GPP TS 23.288 V17.2.0 provides:

The NWDAF (Network Data Analytics Function) is part of the architecture specified in TS 23.501 [2] and uses the mechanisms and interfaces specified for 5GC in TS 23.501 [2] and OAM services (see clause 6.2.3.1).

The NWDAF interacts with different entities for different purposes:

Data collection based on subscription to events provided by AMF, SMF, PCF, UDM, AF (directly or via NEF), and OAM;

[Optionally] Analytics and Data collection using the DCCF (Data Collection Coordination Function);

Retrieval of information from data repositories (e.g. UDR via UDM for subscriber-related information);

[Optionally] Storage and retrieval of information from ADRF (Analytics Data Repository Function);

[Optionally] Analytics and Data collection from MFAF (Messaging Framework Adaptor Function);

Retrieval of information about NFs (e.g. from NRF for NF-related information);

On demand provision of analytics to consumers, as specified in clause 6.

Provision of bulked data to consumers, as specified in clause 6.

A single instance or multiple instances of NWDAF may be deployed in a PLMN. If multiple NWDAF instances are deployed, the architecture supports deploying the NWDAF as a central NF, as a collection of distributed NFs, or as a combination of both.

If multiple NWDAF instances are deployed, an NWDAF can act as an aggregate point (i.e. Aggregator NWDAF) and collect analytics information from other NWDAFs, which may have different Serving Areas, to produce the aggregated analytics (per Analytics ID), possibly with Analytics generated by itself NOTE 1: When multiple NWDAFs exist, not all of them need to be able to provide the same type of analytics results, i.e. some of them can be specialized in providing certain types of analytics. An Analytics ID information element is used to identify the type of supported analytics that NWDAF can generate.

NOTE 2: NWDAF instance(s) can be collocated with a 5GS NF.

SUMMARY

The disclosure has been made to address at least the above-mentioned problems and/or disadvantages and to provide at least the advantages described below.

An aspect of the disclosure provides a method performed by an AMF, the method including receiving, from a UE, first information indicating a location of the UE; receiving, from an NWDAF, second information for verifying the first information; and verifying the first information based on the second information, with the second information including information on at least one UE related analytic.

Another aspect of the disclosure provides a method performed by an NWDAF, including receiving, from an AMF, first information indicating a location of a UE; obtaining at least one UE related analytic corresponding to a respective geographical area; aggregating at least one UE related analytic; and transmitting, to the AMF, second information for verifying the first information, with the second information including information on the aggregated at least one UE related analytic.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Figure 1:
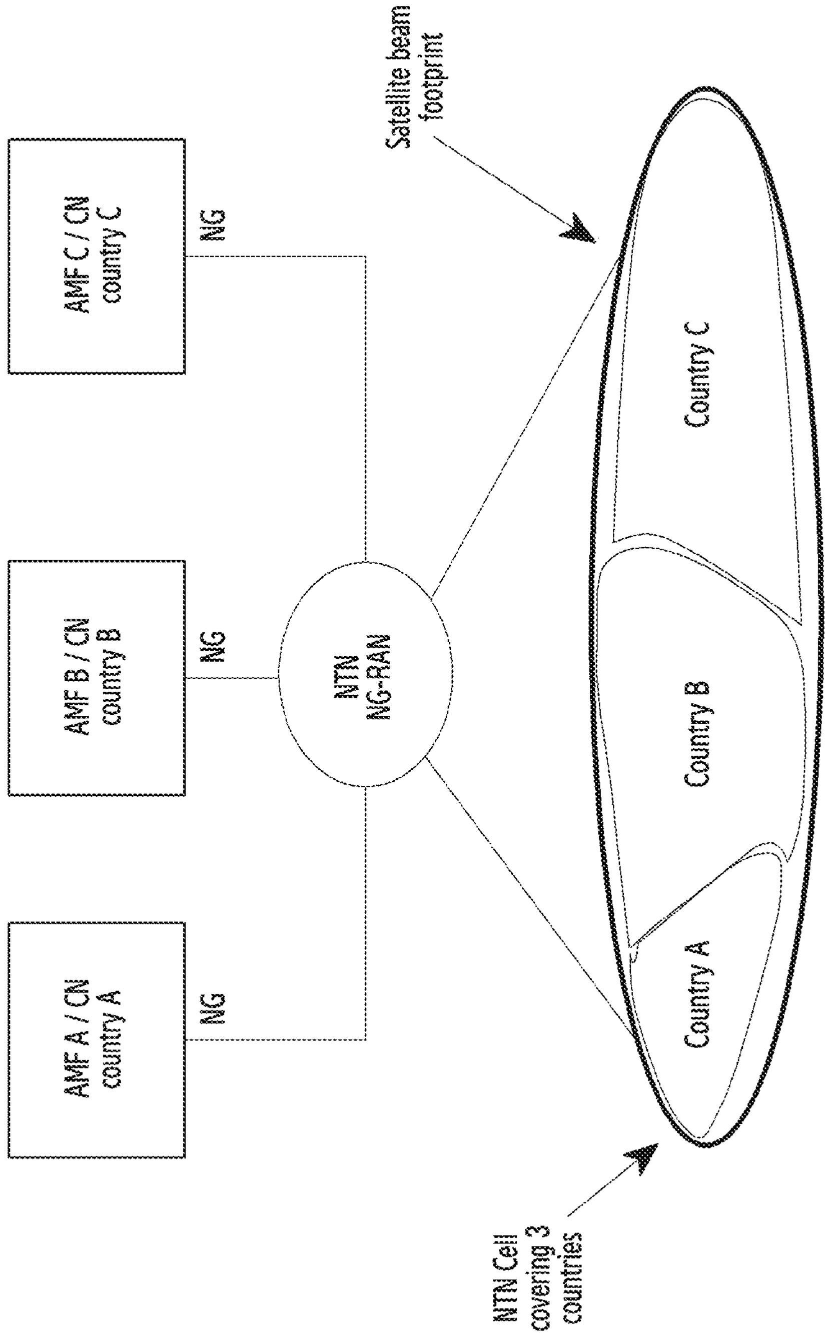
FIG. 1 (RELATED ART)
FIG. 1 illustrates a simplified NTN.

The following description of examples of the present disclosure, with reference to the accompanying drawings, is provided to assist in a comprehensive understanding of the present disclosure, as defined by the claims. The description includes various specific details to assist in that understanding but these are to be regarded as merely exemplary. Accordingly, those of ordinary skill in the art will recognize that various changes and modifications of the examples described herein can be made without departing from the scope of the disclosure. In the drawings, the same or similar components may be designated by the same or similar reference numerals, although they may be illustrated in different drawings. Detailed descriptions of techniques, structures, constructions, functions or processes known in the art may be omitted for clarity and conciseness, and to avoid obscuring the subject matter of the present disclosure. The terms and words used herein are not limited to the bibliographical or standard meanings, but, are merely used to enable a clear and consistent understanding of the disclosure.

Throughout the description and claims of this specification, the terms comprise, include and contain and variations thereof, e.g., comprising and comprises, mean including but not limited to, and are not intended to (and do not) exclude other features, elements, components, integers, steps, processes, operations, functions, characteristics, properties and/or groups thereof.

Throughout the description and claims, the singular form, for example a, an and the, encompasses the plural unless the context otherwise requires. For example, reference to an object includes reference to one or more of such objects.

Throughout the description and claims, language in the general form of X for Y (where Y is some action, process, operation, function, activity or step and X is some means for carrying out that action, process, operation, function, activity or step) encompasses means X adapted, configured or arranged specifically, but not necessarily exclusively, to do Y.

Features, elements, components, integers, steps, processes, operations, functions, characteristics, properties, and/or groups thereof described or disclosed in conjunction with a particular aspect, embodiment, example or claim of the present disclosure are to be understood to be applicable to any other aspect, embodiment, example or claim described herein unless incompatible therewith.

Certain examples of the disclosure provide methods, apparatus and systems for providing a UE location in a network. For example, the disclosure provide methods, apparatus and systems for providing a more trusted or reliable UE location in a 3GPP 5G NTN. However, as would be understood by one of ordinary skill in the art, the disclosure is not limited to these examples, and may be applied in any suitable system or standard, e.g., one or more existing and/or future generation wireless communication systems or standards, including any existing or future releases of the same standards specification, e.g., 3GPP 5G.

The following examples are applicable to, and use terminology associated with, 3GPP 5G. However, as would be understood by one of ordinary skill in the art, the techniques disclosed herein are not limited to 3GPP 5G. For example, the functionality of the various network entities and other features disclosed herein may be applied to corresponding or equivalent entities or features in other communication systems or standards. Corresponding or equivalent entities or features may be regarded as entities or features that perform the same or similar role, function or purpose within the network. For example, the functionality of the AMF may be applied to any other suitable type of entity performing mobility management functions, the functionality of the NWDAF may be applied to any other suitable type of entity providing network analytics, and the functionality of the NG-RAN node (e.g., a base station or gNB) may be applied to any other suitable type of entity performing RAN functions. As would be understood by one of ordinary skill in the art, the transmission of information between network entities is not limited to the specific form, type or order of messages described in relation to the examples disclosed herein.

A particular network entity may be implemented as a network element on a dedicated hardware, as a software instance running on a dedicated hardware, and/or as a virtualized function instantiated on an appropriate platform, e.g., on a cloud infrastructure.

As would be understood by one of ordinary skill in the art, the present disclosure is not limited to the specific examples disclosed herein. For example:

- The techniques disclosed herein are not limited to 3GPP 5G.
- One or more entities in the examples disclosed herein may be replaced with one or more alternative entities performing equivalent or corresponding functions, processes or operations.
- One or more of the messages in the examples disclosed herein may be replaced with one or more alternative messages, signals or other type of information carriers that communicate equivalent or corresponding information.
- One or more elements or entities may be added to the examples disclosed herein.
- One or more non-essential elements or entities may be omitted in certain embodiments.
- The functions, processes or operations of a particular entity in an embodiments may be divided between two or more separate entities in an alternative embodiment.
- The functions, processes or operations of two or more separate entities in one embodiment may be performed by a single entity in an alternative embodiment.
- Information carried by a particular message in one embodiment may be carried by two or more separate messages in an alternative embodiment.
- Information carried by two or more separate messages in one embodiment may be carried by a single message in an alternative embodiment.
- The order in which operations are performed and/or the order in which messages are transmitted may be modified, if possible, in alternative embodiments.

Certain examples of the disclosure may be provided in the form of an apparatus/device/network entity configured to perform one or more defined network functions and/or a method therefor. Certain examples of the disclosure may be provided in the form of a system (e.g., a network or wireless communication system) that includes one or more such apparatuses/devices/network entities, and/or a method therefor.

An NTN deployment may have a cell that covers multiple geographical regions (e.g., countries), one or more cells that cover a single geographical region (e.g., country) and/or multiple cells that cover respective geographical regions (e.g., countries). NTN cells may be served by the same or different NG-RAN nodes in the same or different geographical regions (e.g., countries) An NG-RAN node corresponding to a cell may select an AMF of a CN that can serve a UE located within the cell according to the particular geographical location in which the UE is located. To perform such a selection, the NG-RAN node should know the UE location. However, certain problems are associated with conventional processes.

Suitable AMF/CN/public land mobile network (PLMN) selection is important, but the NG-RAN node may not be able to select a suitable AMF/CN/PLMN without precise UE location information (e.g., global navigation satellite system (GNSS) information). This problem may be exacerbated if the UE is located on or close to a country border. For example, at a border area, it may be difficult for the UE to report its location accurately.

A UE may not be allowed access in certain locations/areas in the NTN cell (e.g., contested borders, restricted areas, etc.). The existing standard has not yet defined which network entity (e.g., an NG-RAN and/or a CN) can restrict UE access to different locations/areas in an NTN cell, and how such restriction may be implemented.

UE location information, e.g., location information based on GNSS measurements, may be provided to the NG-RAN after access stratum (AS) security has been enabled. In the current standard, it has been agreed (meeting RAN2 #115-e) pending SA3 agreement that in the case of initial access the UE reports its location information (e.g., coarse GNSS information) to NG-RAN using RRC signaling.

UE location information may not be considered reliable and/or trusted unless the information is verified and/or validated by the network. In the current standard, it is not yet defined how UE location information may be verified and/or validated by the network and which network entity (e.g., NG-RAN and/or CN) may perform such verification and/or validation.

As such, the following scenarios may be considered:

Scenario 1: a UE may intentionally report misleading/misrepresented location information to the network. For example, so that the UE can operate in an area that does not correspond to the actual location of the UE. That is, the UE may be trying to gain access to a restricted area, a contested border area, an area not included in a user subscription and/or an area under different policies/regulations to those in the actual UE location.

Scenario 2: a UE may erroneously report incorrect or inaccurate location information. For example, due to inaccuracy in one or more measurement methods, such as inaccuracy in GNSS positioning. This may result in the UE being unable to operate in the desired country.

Scenario 3: a UE may unintentionally report incorrect or inaccurate location information. For example, the UE may operate in a border area close to two or more countries and the uncertainty in the UE location may be such that it is not possible to resolve which country the UE is located.

Figure 2:
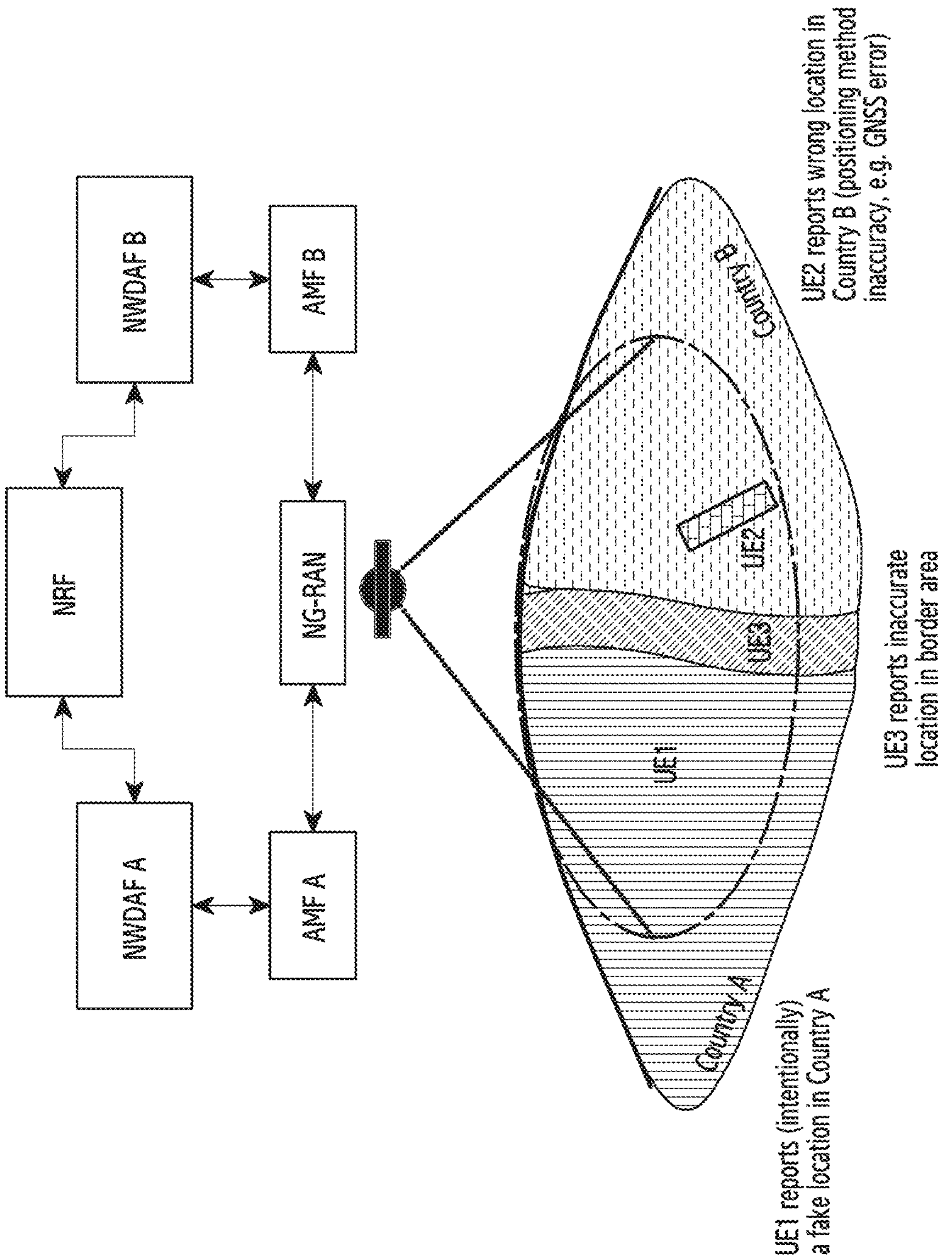
FIG. 2 illustrates an NTN cell serving multiple countries with examples of a UE providing misleading, erroneous, and inaccurate location information.

FIG. 2 illustrates an NTN cell serving multiple countries with examples of a UE providing misleading, erroneous and inaccurate location information.

In FIG. 2, an NTN cell serves multiple countries (country A and country B in this example) with examples of the three scenarios, as described above. In particular, in the example of FIG. 2, UE1 intentionally reports a fake location in Country A, UE2 reports a wrong location in Country B (e.g., due to a positioning method inaccuracy, such as a GNSS error), and UE 3 reports an inaccurate location in a border area between Country A and Country B.

In view of the above, what is desired is a technique to ensure that the UE reports trusted and/or reliable location information. Preferably, what is desired is a technique to enable the reporting of trusted and/or reliable location information by the UE both before and after AS Security establishment.

To address the problems with conventional systems, in certain examples of the disclosure, when first information indicating a location of the UE (e.g., as determined by the UE) is received by a network entity (e.g., an NG-RAN or an AMF), second (additional) information is used for verifying, validating, or confirming the first information.

In certain examples, the second information may be information to be provided by the UE (e.g., additional location measurements) and/or information provided by the CN (e.g., CN assistance information and/or analytics information). For example, second information provided by the UE may be used in situations in which the first information may be unintentionally erroneous, incorrect or inaccurate, while second information provided by the CN may be used in situations in which the first information may be intentionally erroneous, incorrect or inaccurate (e.g., fraudulent information). In certain examples, the second information may comprise information from both the UE and the CN.

In the disclosure, the terms location, location information, etc., may refer to a location specified at any suitable level of granularity (e.g., tracking area or cell), or specified at any suitable level of accuracy, precision or resolution (e.g., centimeter meter, kilometer). The present disclosure is not limited to any specific example.

For example, certain examples may apply one or more of the following techniques.

1. The NG-RAN node may request further positioning information from the UE. This may be done to perform a secondary-level check on the reported UE location information.
2. The NG-RAN node may request assistance location information from the CN (e.g., AMF).
3. The NG-RAN node may request that the UE perform location measurement using a different positioning method to that used to obtain the reported location information.
4. Multiple location/positioning results may be consolidated/aggregated/combined to obtain more accurate location information at the NG-RAN node.
5. The NG-RAN node may apply a certain predefined policy in relation to location information that may result in ambiguity regarding the geographical region corresponding to the reported UE location. For example, a suitable policy may be based on a certain treaty (e.g., international treaty) relating to the relevant geographical areas (e.g., countries). For example, for borders within the European Union, a relatively relaxed policy may be applied. On the other hand, for disputed borders, a relatively strict policy may be applied. The selection of a certain policy may be determined based on pre-configured information, for example in the NG-RAN node.

Any suitable existing or future positioning method may be used in various examples of the present disclosure. Some examples of positioning methods include the following (See, TS 38.215, Section 5.1), although the disclosure is not limited to these examples:

- Down load positioning reference signal reference signal received power (DL PRS-RSRP) measured on a positioning reference signal (PRS)
- Down load reference signal time difference (DL-RSTD)
- UE Rx—Tx time difference
- Secondary synchronization reference signal antenna relative phase (SS-RSARP)

In certain examples, techniques 1 and 2, above, may be applied to Scenario 1, above, techniques 3 and 4, above, may be applied to Scenario 2, above, and/or technique 5, above, may be applied to Scenario 3, above. However, the present disclosure is not limited to these cases. For example, techniques 1-4, above, may be applied in any suitable combination to Scenarios 1-3, above, while technique 5 may be applied in any suitable combination with techniques 1-4, above, to Scenario 3, above.

In certain examples, depending on the desired service, the above techniques (e.g., one or more of the above techniques 1-4) may be selectively applied in consideration of a trade-off between signaling/processing overhead/latency and a required/requested accuracy of the UE location.

In certain examples, when a UE reports its location to the network, the network may obtain additional information in order to verify that the UE reported location is accurate and/or reliable. For example, the additional information may be obtained using CN assistance information and/or NWDAF analytics.

CN assistance information is typically used for RAN optimization, for example UE state transition steering and paging in RRC inactive state. In certain examples, such information may be used to obtain information on the expected location of the UE. The expected location may then be compared to the UE reported location. If the reported location does not correspond to the expected location, then an alert may be triggered. Examples of information include:

- Expected handover (HO) behavior—information indicating the expected interval between inter-RAN handovers.
- Expected UE mobility—information indicating whether the UE is expected to be stationary or mobile.
- Expected UE moving trajectory—information indicating the expected trajectory of the UE. This information may be derived, for example, from statistical information, expected UE behavior parameters and/or subscription information.

The CN assistance information may be calculated using any suitable algorithm based on any suitable information and/or criteria. Furthermore, any suitable criteria (e.g., criteria relating to the suitability and/or stability of the information) may be used to decide whether and when to send the assistance information to the RAN. These algorithms and criteria may be vendor specific.

CN assistance information at any suitable level of granularity may be used, for example tracking area (TA) or cell level granularity, or any other suitable (e.g., finer level) granularity.

Information on the expected location of the UE may alternatively or additionally be obtained from NWDAF analytics (e.g., statistics and/or predictions) relating to UE mobility. UE location analytics may be reported on any suitable level of granularity, e.g., TA or cell level granularity, or any other suitable (e.g., finer level) granularity. Certain examples of the present disclosure may provide UE location analytics on a finer granularity (e.g., location services (LCS)) with suitable coordination between NWDAF and one or more other network entities (e.g., location management function (LMF)/gateway mobile location center (GMLC)), if required. If an NG-RAN is not able to subscribe to NWDAF analytics directly, then the analytics may be provided to the NG-RAN through another network entity that is able to subscribe to NWDAF analytics and then provide the analytics information to the NG-RAN.

In certain examples, a mechanism may be provided for NG-RAN/LMF to determine that a re-positioning of the UE is required and to trigger the method, as set forth below. Currently, this functionality is supported when a requested location quality of service (QoS) (i.e., accuracy) is not met.

In certain example, multiple QoS classes may be used by the LCS system when multiple positioning mechanisms are expected to be used from the onset of the location estimation process. In this case, the location procedure may require support for positioning and aggregation of results of multiple positioning methods/accuracies. In certain examples fine-tuning this operation (e.g., the number of accuracies in the request) may be used to optimize the trade-off between overhead/latency and accuracy.

In certain examples, multiple independent location estimation requests may be possible.

In certain examples, one or more of the above techniques may be applied when the UE is in an RRC_CONNECTED state.

Figure 3A:
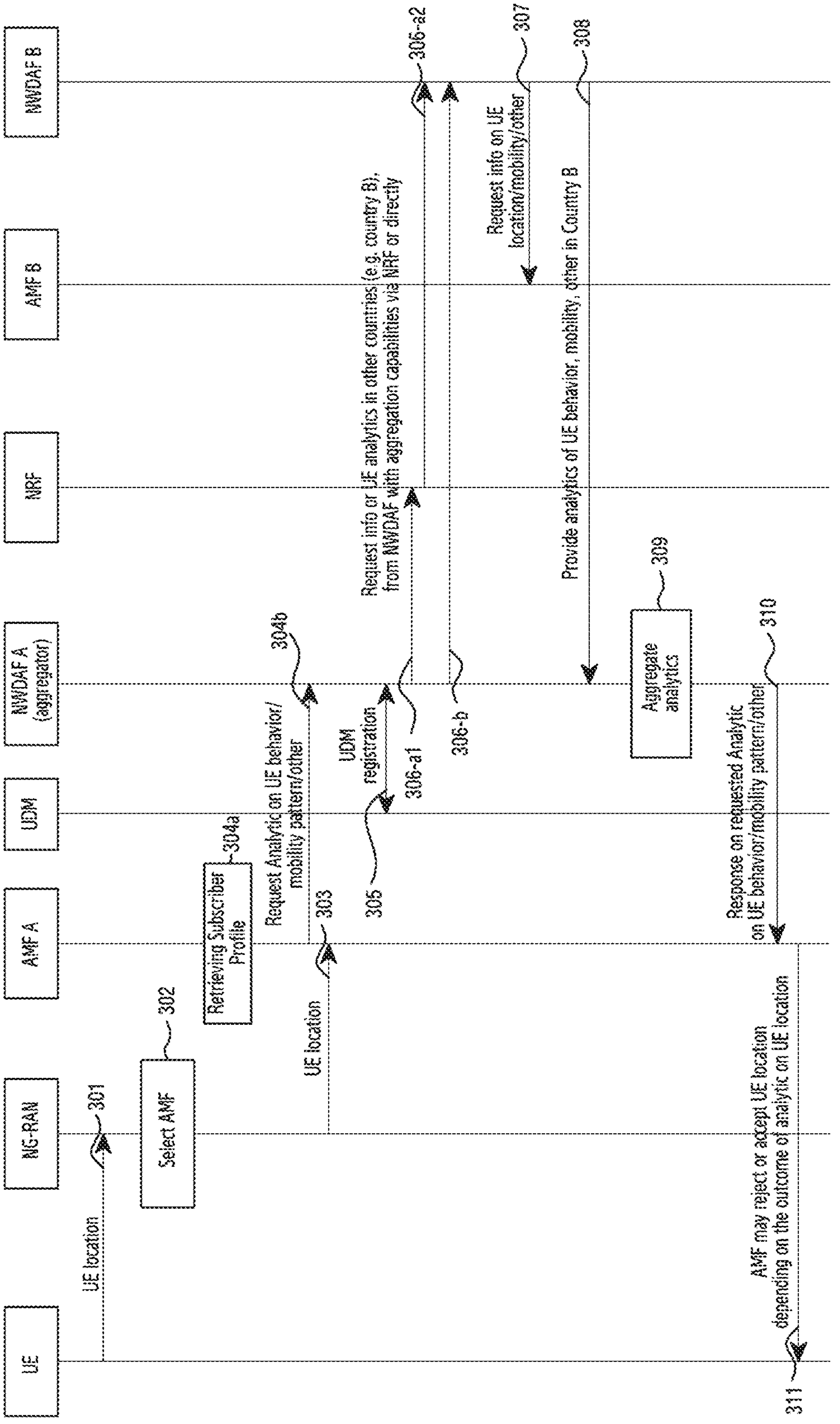
FIG. 3A is a signal flow diagram in which a reported location of a UE is verified or validated based on NWDAF analytics according to an embodiment.

FIG. 3A is a signal flow diagram in which the reported location of a UE is verified or validated based on NWDAF analytics according to an embodiment.

In FIG. 3A, the network includes a UE, an NG-RAN, an AMF, a unified data management (UDM), an NWDAF, and a network repository function (NRF). The example provided in FIG. 3A includes a first AMF (AMF A) and a first NWDAF (NWDAF A) corresponding to a first geographical location (e.g., a first country), and a second AMF (AMF B) and a second NWDAF (NWDAF B) corresponding to a second geographical location (e.g., a second country). In this example, NWDAF A operates as an aggregator NWDAF.

One of ordinary skill in the art will appreciate that the network may include one or more additional or alternative entities performing various network functions, and that certain operations performed by a particular network entity may be performed by a different network entity in alternative examples. In such alternative examples, any information required to perform a certain operation may be provided to the relevant network entity performing the operation via suitable messages transmitted to that network entity.

In step 301, the UE reports its location to the NG-RAN.

In step 302, the NG-RAN selects a suitable AMF based on the reported UE location, e.g., AMF A, serving the first geographical location (Country A).

In step 303, the NG-RAN transmits a message to AMF A indicating that verification, validation or confirmation of the previously reported UE location is required. The transmitted message may include the reported UE location.

In subsequent steps, the AMF A obtains information allowing the reported UE location (e.g., its accuracy and/or reliability) to be verified, validated or confirmed. In particular, AMF A obtains information based on analytics acquired through one or more NWDAF corresponding to one or more geographical areas (e.g., countries). Examples of these steps are set forth below.

In step 304*a*, the AMF A retrieves the subscriber profile of the UE from a UDM and determines from the subscriber profile which NWDAF is responsible for the geographical area where the UE has reported its location. In the example of FIG. 3A, the relevant NWDAF is NWDAF A.

In step 304*b*, the AMF A transmits an analytics subscription request to the determined NWDAF A. Here, AMF A may request/subscribe to receive analytics for one or more analytics identifiers (IDs) in a given area of interest (i.e., UE related analytics). The AMF A may provide reported assistance information on UE (e.g., UE location, UE location trends, timestamps, etc.) as input data to NWDAF A. The AMF A may request analytics on UE behavior, UE abnormal behavior, mobility, or any other suitable type of analytics.

In step 305, the NWDAF A registers with the UDM for the UE that it is collecting data for and for the related Analytics ID(s). Thereafter, the NWDAF A transmits a message to one or more other NWDAF. The message includes UE information together with a request for available analytics on this UE from the NWDAF. In the example in FIG. 3A, the NWDAF A requests analytics from the NWDAF B. The request message may be transmitted to the NWDAF B indirectly through another network entity, i.e., an NRF, in steps 306-*a*1 and 306-*a*2. Alternatively, the request message may be transmitted directly to the NWDAF B in step 306-*b*.

Thereafter, each NWDAF obtains analytics related to the UE corresponding to a respective geographical area by processing data collected from one or more network entities, for example AMF, SMF and/or any other suitable NFs.

As illustrated in FIG. 3A, in step 307, the NWDAF B obtains relevant analytics related to the UE corresponding to the second geographical area based on information acquired from AMF B (and possibly other NFs). Also, the NWDAF A may obtain relevant analytics related to the UE corresponding to the first geographical area based on information acquired from the AMF A (and possibly other NFs). Data on the UE may include, for example, previous locations of the UE, previous areas where the UE visited in a given country, timestamps on UE presence in previous areas/locations, any reported UE abnormal behavior, any other information related to UE or UE behavior in a given country, etc.

The analytics obtained by each NWDAF is provided to the NWDAF aggregator. As illustrated in step 308, the analytics obtained by the NWDAF B are provided to the NWDAF A.

In step 309, the NWDAF A aggregates the obtained analytics.

In step 310, the NWDAF A provides the aggregated analytics information to AMF A in response to the previous subscription request in step 304.

In step 311, the AMF A uses the aggregated analytics information to verify the UE location reported in previous step 303. The AMF A may either reject or accept the reported UE location based on the result of the verification/validation/confirmation.

A network entity (e.g., an AMF and/or an NG-RAN) may operate in any suitable manner based on the result of verification/validation/confirmation of the reported UE location. For example, the AMF A may decide that the UE should not be allowed in the currently reported location, for example if the currently reported UE location does not correspond to an expected UE location or other expected UE behavior. In other examples, based on the reported UE analytics (e.g., UE behavior), the AMF and/or NG-RAN may behave according to one or more of the following non-limiting examples:

- In case of UE in initial access, the AMF may accept or reject a UE registration request to the UE reported location. In case of rejection, the AMF may provide a cause value to the UE and/or NG-RAN (e.g., inaccurate/wrong location, location is not supported, or the like).
- The AMF may forward the full, part or a modified version of the analytics (e.g., UE behavior) to NG-RAN that will use it accordingly. For example, NG-RAN may release the UE in case of an unexpected UE location.
- The AMF may decide to initiate UE release procedure with the NG-RAN, and indicate the cause of UE context release as UE (e.g., inaccurate/wrong/unexpected UE Location, UE Location is not supported, or the like).

Figure 3B:
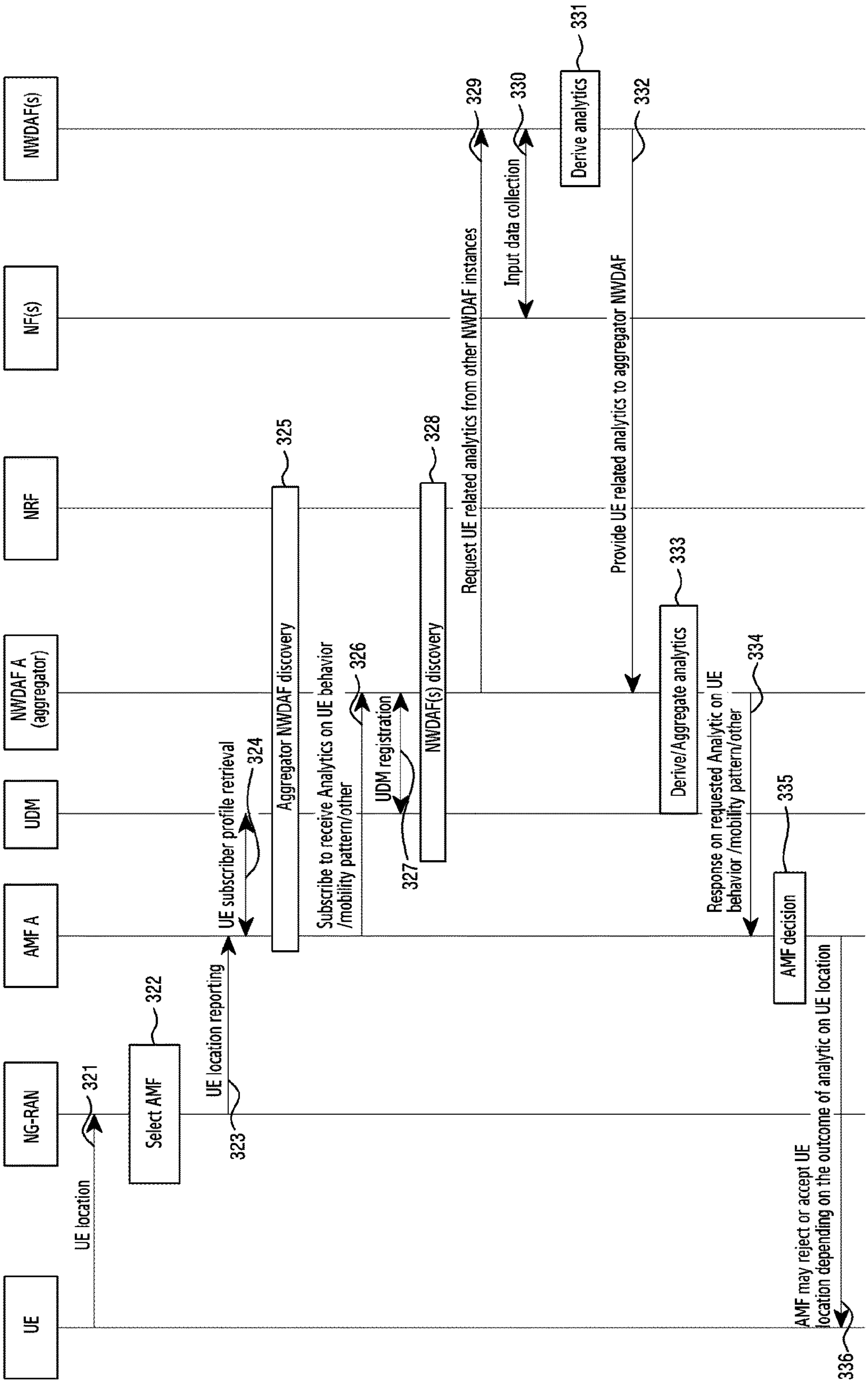
FIG. 3B is a signal flow diagram in which the reported location of a UE is verified or validated based on NWDAF analytics according to an embodiment.

FIG. 3B is a signal flow diagram in which the reported location of a UE is verified or validated based on NWDAF analytics according to an embodiment.

In FIG. 3B, the network comprises a UE, an NG-RAN, an AMF, a UDM, an NWDAF, an NRF, and/or other NFs (e.g., AMFs, SMFs, etc.). FIG. 3B includes an AMF (AMF A) and a first NWDAF (NWDAF A) corresponding to a first geographical location (e.g., a first country), and an NF (e.g., AMF, SMF and/or other NF) and a second NWDAF (NWDAF B) corresponding to a second geographical location (e.g., a second country). In this example, the NWDAF A operates as an aggregator NWDAF.

In step 321, the UE reports its location to a NG-RAN.

In step 322, the NG-RAN selects a suitable AMF based on the reported UE location. The AMF A, serving the first geographical location (Country A), is selected.

In step 323, the NG-RAN transmits a message to the AMF A indicating that verification, validation or confirmation of the UE location reported in step 321 is required. The message transmitted in step 323 may include the reported UE location.

In step 324, the AMF A retrieves the subscriber profile of the UE from UDM.

In step 325, if not done previously, the AMF discovers NWDAF, if available, supporting analytics aggregation. In certain examples, analytics aggregation may be performed according to Clause 6.1A.2 of 3GPP TS 23.288. The NWDAF discovery may be performed according to Clause 5.2 of 3GPP TS 23.288 and Clause 6.3.13 of 3GPP TS 23.501. In addition, the AMF uses NWDAF serving area information, and NWDAF location information to select the appropriate NWDAF instance.

In step 326, the AMF requests or subscribes to UE related analytics (e.g., expected UE behavior, abnormal behavior, UE mobility) for one or more analytic IDs in a given area of interest from a NWDAF that covers the country where the UE reported its location.

In step 327, the selected NWDAF may register with the UDM for the UE that it is collecting data for and for the related analytic ID(s).

In step 328, if needed, and if the selected NWDAF has analytics aggregation capability, the NWDAF for which the AMF requested analytics discovers other NWDAF instances that may provide relevant UE related analytics on the UE ID that provided its location in step 321.

In step 329, the aggregator NWDAF requests UE related analytics from other NWDAF(s) on the UE which initially provided its location information to NG-RAN.

In step 330, if needed, other NWDAFs contacted by the aggregator NWDAF may collect data from other NFs (e.g., AMFs, SMFs, etc.) related to this UE (e.g., previous locations in other countries, any reported UE abnormal behavior, etc.).

In step 331, the NWDAF(s) contacted by the aggregator NWDAF derive(s) UE related analytics for the UE in the area it is responsible for, e.g. (part of) a country.

In step 332, the NWDAF(s) contacted by the aggregator NWDAF report(s) their analytics (e.g., UE mobility, UE abnormal behavior, etc.) to the aggregator NWDAF.

In step 333, the aggregator NWDAF performs aggregation of the reported analytics and derives analytics.

In step 334, the aggregator NWDAF provides (the potentially aggregated) analytics to the AMF.

In step 335, the AMF decides whether the UE should or should not be allowed access given the currently reported location.

In step 336, the AMF interacts with NG-RAN and/or the UE to convey the decision. For example, based on the reported UE analytics (e.g., UE behavior), the AMF and/or NG-RAN may behave as follows:

- In case of UE in initial access, the AMF may accept or reject UE Registration Request to the UE reported location. In case of rejection, the AMF may provide a cause value to the UE and/or NG-RAN (e.g., inaccurate/wrong location, location is not supported, or the like).
- The AMF may forward the full, part or a modified version of the analytics (e.g., UE behavior) to the NG-RAN, which may act upon it. For example, the NG-RAN may release the UE in case of an unexpected UE location.
- The AMF may decide to initiate the UE release procedure with the NG-RAN, and indicates the cause of UE context release as the UE (e.g., inaccurate/wrong/unexpected UE location, UE location is not supported, or the like).

In certain examples, steps 327-332 of FIG. 3B may be treated as optional, as indicated by the dotted lines in FIG. 3B.

In certain examples, an NG-RAN node may send an indication to an AMF entity to request verification or validation of a location reported by a UE. For example, the indication may be provided in the form of one or more new and/or existing information elements (IEs). A new IE may be a location verify request or other suitable name. The NG-RAN node may include the IE in one or more existing NG messages (e.g., INITIAL UE MESSAGE) and/or one or more newly defined messages.

Figure 4:
FIG. 4 illustrates an NG-RAN node sending an indication to an AMF to verify a UE location reported by the UE according to an embodiment.

FIG. 4 illustrates an NG-RAN node sending an indication to an AMF to request verification or validation of a UE location reported by the UE according to an embodiment.

Embodiments of the present disclosure, the AMF entity may send all or a part of UE analytics acquired from the NWDAF, either unmodified or modified, to the NG-RAN. The AMF entity may perform a certain action and/or request the NG-RAN to perform a certain action based on the acquired analytics. The AMF may include the above information in one or more new and/or existing IEs and/or messages.

Embodiments of the present disclosure provide a method for verifying location information of a UE in a network comprising the UE and one or more network entity, with the method including receiving, by a first network entity (e.g. NG-RAN or AMF), first information indicating a location of the UE (e.g., as determined by the UE); receiving, by the first network entity, second information for verifying the first information; and verifying the first information based on the second information. The second information may include at least one of CN assistance information and information determined based on network analytics (e.g., obtained by an NWDAF network entity). Additionally or alternatively, the second information may comprise additional information provided by the UE.

Embodiments of the present disclosure provide a method for verifying location information of a UE in a network that includes the UE and one or more network entity, with the method including receiving, by a first network entity (e.g., NG-RAN or AMF), first information indicating a location of the UE (e.g., as determined by the UE); receiving, by the first network entity, second information for verifying the first information; and verifying the first information based on the second information.

The first information may include information indicating the location of the UE (e.g., as determined by the UE) at a first time, and the second information may comprise information indicating the location of the UE (e.g., as determined by the UE) at a second time.

The first information may include information indicating the location of the UE (e.g., as determined by the UE) using a first positioning method, and the second information may comprise information indicating the location of the UE (e.g., as determined by the UE) using a second positioning method different from the first positioning method.

The first information may include information indicating the location of the UE (e.g., as determined by the UE) at a first level of granularity (or first accuracy/precision/resolution), and the second information may comprise information indicating the location of the UE (e.g., as determined by the UE) at a second level of granularity (or second accuracy/precision/resolution) different from (e.g., having greater precision than) the first level of granularity (or first accuracy/precision/resolution).

The second information may include CN assistance information.

The second information may include information determined based on network analytics (e.g., obtained by an NWDAF network entity).

The method may further include obtaining, by each of two or more NWDAF entities, network analytics related to the UE corresponding to a respective geographical area, and aggregating the network analytics obtained by each NWDAF entity, with the second information including information based on the aggregated network analytics.

The second information may include one or more of information indicating an expected interval between inter-RAN handovers; information indicating whether the UE is expected to be stationary or mobile; and information indicating the expected trajectory of the UE (e.g., derived from statistical information, expected UE behavior parameters and/or subscription information).

The second information may include information at a TA level of granularity or a cell level of granularity, or any other suitable (e.g., finer level) granularity.

The method may further include aggregating or combining the first information and the second information, with the first information verified based on the aggregated or combined information.

The method may further include requesting, by the first network entity, the second information, with the second information being received by the first network entity in response to the request.

The method may further include determining that one or more first predetermined criteria are satisfied, with the second information being requested by the first network entity based on a result of the determination.

The method may further include determining, by a second network entity, that one or more second predetermined criteria are satisfied, with the second information being provided to the first network entity based on a result of the determination.

The UE may be in an RRC_CONNECTED state.

Verifying the first information may include verifying that the first information is authentic, reliable and/or accurate.

When verification of the first information results in ambiguity as to the geographical area corresponding to the first information, the method may further include applying a predefined policy to determine which geographical area should be regarded as corresponding to the first information.

Embodiments of the disclosure provide a first network entity (e.g., RAN entity or AMF entity) configured to operate according to a method of any aspect, example, embodiment and/or claim disclosed herein.

Embodiments of the disclosure provide a second network entity (e.g., UE, RAN entity, AMF entity, UDM entity, NWDAF entity and/or NRF entity) configured to cooperate with a first network entity of the preceding example according to a method of any aspect, example, embodiment and/or claim disclosed herein.

Embodiments of the disclosure provide a network (or wireless communication system) comprising one or more network entities (e.g., first and/or second network entities) according to the preceding examples.

Embodiments of the disclosure provide a computer program comprising instructions which, when the program is executed by a computer or processor, cause the computer or processor to carry out a method according to any aspect, example, embodiment disclosed herein.

Embodiments of the disclosure provide a computer or processor-readable data carrier having stored thereon a computer program according to the preceding example.

Figure 5:
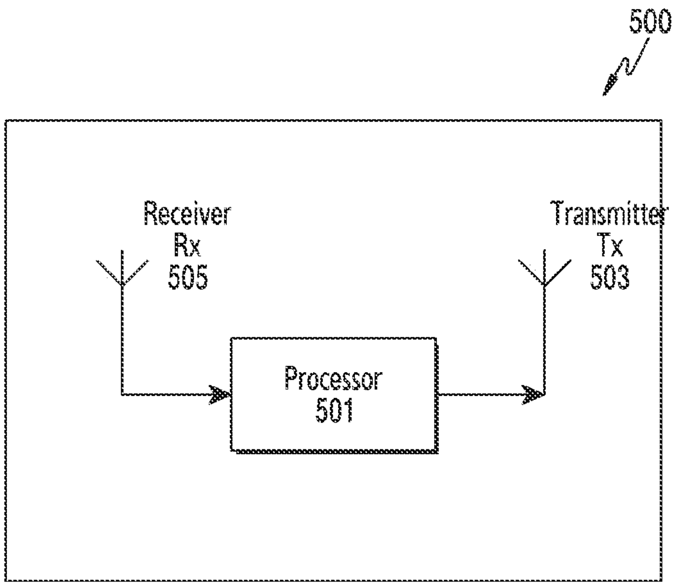
FIG. 5 illustrates a network entity according to in an embodiment.

FIG. 5 illustrates a network entity according to an embodiment. For example, the UE, RAN, AMF, NWDAF, NRF and/or other NFs may be provided in the form of the network entity illustrated in FIG. 5. One of ordinary skill in the art will appreciate that a network entity may be implemented, for example, as a network element on a dedicated hardware, as a software instance running on a dedicated hardware, and/or as a virtualized function instantiated on an appropriate platform, e.g., on a cloud infrastructure.

The entity 500 includes a processor (or controller) 501, a transmitter 503 and a receiver 505. The receiver 505 is configured for receiving one or more messages from one or more other network entities, for example as described above. The transmitter 503 is configured for transmitting one or more messages to one or more other network entities, for example as described above. The processor 501 is configured for performing one or more operations, for example according to the operations as described above.

Figure 6:
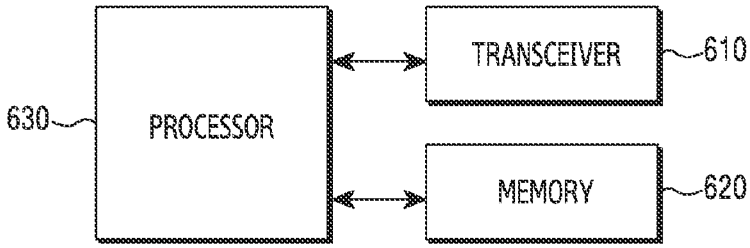
FIG. 6 illustrates a UE according to an embodiment.

FIG. 6 illustrates a UE according to an embodiment.

As shown in FIG. 6, the UE may include a transceiver 610, a memory 620, and a processor 630. The transceiver 610, the memory 620, and the processor 630 of the UE may operate according to a communication method of the UE described above. However, the components of the UE are not limited thereto. For example, the UE may include fewer or a greater number of components than those described above. In addition, the processor 630, the transceiver 610, and the memory 620 may be implemented as a single chip. Also, the processor 630 may include at least one processor.

The transceiver 610 collectively refers to a UE receiver and a UE transmitter, and may transmit/receive a signal to/from a base station or a network entity. The signal transmitted or received to or from the base station or a network entity may include control information and data. The transceiver 610 may include an RF transmitter for up-converting and amplifying a frequency of a transmitted signal, and an RF receiver for amplifying low-noise and down-converting a frequency of a received signal. However, this is only an example of the transceiver 610 and components of the transceiver 610 are not limited to the RF transmitter and the RF receiver.

The transceiver 610 may receive and output, to the processor 630, a signal received through a wireless channel, and transmit a signal output from the processor 630 through the wireless channel.

The memory 620 may store a program and data required for operations of the UE. Also, the memory 620 may store control information or data included in a signal obtained by the UE. The memory 620 may be a storage medium, such as read-only memory (ROM), random access memory (RAM), a hard drive disk, a compact disk read only memory (CD-ROM), and a digital video disk (DVD), or a combination of storage media.

The processor 630 may control a series of processes such that the UE operates as described above. For example, the transceiver 610 may receive a data signal including a control signal transmitted by the base station or the network entity, and the processor 630 may determine a result of receiving the control signal and the data signal transmitted by the base station or the network entity.

Figure 7:
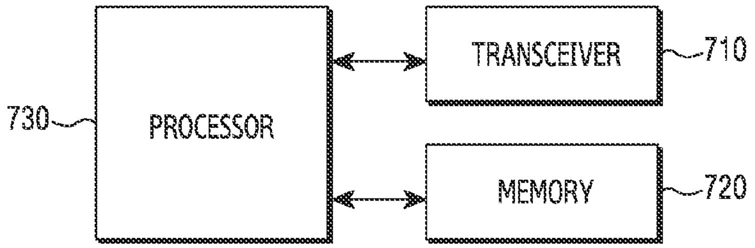
FIG. 7 illustrates a base station or a CN entity according to an embodiment.

FIG. 7 illustrates a base station or a CN entity according to an embodiment.

As shown in FIG. 7, the base station according to an embodiment may include a transceiver 710, a memory 720, and a processor 730. The transceiver 710, the memory 720, and the processor 730 of the base station may operate according to a communication method of the base station described above. However, the components of the base station are not limited thereto. For example, the base station may include fewer or a greater number of components than those described above. In addition, the processor 730, the transceiver 710, and the memory 720 may be implemented as a single chip. Also, the processor 730 may include at least one processor.

The transceiver 710 collectively refers to a base station receiver and a base station transmitter, and may transmit/receive a signal to/from a terminal or a network entity. The signal transmitted or received to or from the terminal or a network entity may include control information and data. The transceiver 710 may include an RF transmitter for up-converting and amplifying a frequency of a transmitted signal, and an RF receiver for amplifying low-noise and down-converting a frequency of a received signal. However, this is only an example of the transceiver 710 and components of the transceiver 710 are not limited to the RF transmitter and the RF receiver.

The transceiver 710 may receive and output, to the processor 730, a signal through a wireless channel, and transmit a signal output from the processor 730 through the wireless channel.

The memory 720 may store a program and data required for operations of the base station. Also, the memory 720 may store control information or data included in a signal obtained by the base station. The memory 720 may be a storage medium, such as ROM, RAM, a hard disk, a CD-ROM, and a DVD, or a combination of storage media.

The processor 730 may control a series of processes such that the base station operates as described above. For example, the transceiver 710 may receive a data signal including a control signal transmitted by the terminal, and the processor 730 may determine a result of receiving the control signal and the data signal transmitted by the terminal.

The techniques described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). The one or more elements may be implemented in the form of hardware, software, or any combination of hardware and software.

It will be appreciated that examples of the present disclosure may be implemented in the form of hardware, software or any combination of hardware and software. Any such software may be stored in the form of volatile or non-volatile storage, for example a storage device like a ROM, whether erasable or rewritable or not, or in the form of memory such as, e.g., RAM, memory chips, device or integrated circuits or on an optically or magnetically readable medium such as, e.g., a CD, DVD, magnetic disk or magnetic tape, etc.

It will be appreciated that the storage devices and storage media are embodiments of machine-readable storage that are suitable for storing a program or programs comprising instructions that, when executed, implement certain examples of the present disclosure. Accordingly, certain examples provide a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

According to various embodiments, a method performed by an access and mobility management function (AMF), the method comprising: receiving, from a user equipment (UE), first information indicating a location of the UE; receiving, from a network data analytics function (NWDAF), second information for verifying the first information; and verifying the first information based on the second information, wherein the second information includes information on at least one UE related analytic.

In one embodiment, wherein the first information includes information indicating the location of the UE, as determined by the UE at a first time, and wherein the second information further includes information indicating the location of the UE, as determined by the UE at a second time.

In one embodiment, wherein the first information includes information indicating the location of the UE, as determined by the UE using a first positioning method, and wherein the second information further includes information indicating the location of the UE, as determined by the UE using a second positioning method different from the first positioning method.

In one embodiment, wherein the first information includes information indicating the location of the UE, as determined by the UE at a first level of granularity, and wherein the second information further includes information indicating the location of the UE, as determined by the UE at a second level of granularity different from the first level of granularity.

In one embodiment, wherein the second information further includes at least one of: information indicating an expected interval between inter-radio access network (RAN) handovers; information indicating whether the UE is expected to be stationary or moving; and information indicating an expected trajectory of the UE.

In one embodiment, wherein the second information includes information at least one of a tracking area level of granularity or a cell level of granularity.

In one embodiment, the method further comprising aggregating the first information and the second information, wherein the first information is verified based on the aggregated information.

In one embodiment, the method further comprising requesting, from the NWDAF, the second information, wherein the second information is received in response to the request.

In one embodiment, wherein verifying the first information comprises: verifying that the first information is at least one of authentic, reliable or accurate.

In one embodiment, the method further comprising, in case that verification of the first information results in ambiguity as to a geographical area corresponding to the first information, determining which geographical area should be regarded as corresponding to the first information by applying a predefined policy.

According to various embodiments, a method performed by a network data analytics function (NWDAF), the method comprising: receiving, from an access and mobility management function (AMF), first information indicating a location of a user equipment (UE); obtaining at least one UE related analytic corresponding to a respective geographical area; aggregating at least one UE related analytic; and transmitting, to the AMF, second information for verifying the first information, wherein the second information includes information on the aggregated at least one UE related analytic.

In one embodiment, the method further comprising: determining that one or more second predetermined criteria are satisfied; and transmitting, to the AMF, second information for verifying the first information based on a result of the determination.

According to various embodiments, an apparatus for performing an access and mobility management function (AMF), comprising: at least one transceiver; and at least one processor operably coupled to the at least one transceiver, wherein the at least one processor is configured to: receive, from a user equipment (UE), first information indicating a location of the UE; receive, from a network data analytics function (NWDAF), second information for verifying the first information; and verify the first information based on the second information, wherein the second information includes information on at least one UE related analytic.

In one embodiment, wherein the first information includes information indicating the location of the UE, as determined by the UE at a first time, and wherein the second information further includes information indicating the location of the UE, as determined by the UE at a second time.

In one embodiment, wherein the first information includes information indicating the location of the UE, as determined by the UE using a first positioning method, and wherein the second information further includes information indicating the location of the UE, as determined by the UE using a second positioning method different from the first positioning method.

In one embodiment, wherein the first information includes information indicating the location of the UE, as determined by the UE at a first level of granularity, and wherein the second information further includes information indicating the location of the UE, as determined by the UE at a second level of granularity different from the first level of granularity.

In one embodiment, wherein the second information further includes at least one of: information indicating an expected interval between inter-radio access network (RAN) handovers; information indicating whether the UE is expected to be stationary or moving; and information indicating an expected trajectory of the UE.

In one embodiment, wherein the second information includes information at least one of a tracking area level of granularity or a cell level of granularity.

In one embodiment, wherein the at least one processor is further configured to aggregate the first information and the second information, wherein the first information is verified based on the aggregated information.

In one embodiment, wherein the at least one processor is further configured to request, from the NWDAF, the second information, wherein the second information is received in response to the request.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed:

1. An access and mobility management function (AMF) entity in a mobile communication system, the AMF entity comprising:

a transceiver; and a controller coupled with the transceiver, and configured to:

receive, from a base station of a satellite access, a message indicating that a verification of a location of a user equipment (UE) for the satellite access is required, the message including first information on the location of the UE for the satellite access:

receive, from a network data analytics function (NWDAF) entity, second information for verifying the location of the UE for the satellite access, wherein the second information includes analytic information aggregating UE mobility analytics generated by at least one NWDAF entity and location information estimated by a location management function (LMF) entity, verify the location of the UE based on the analytic information, identify that the UE is not allowed to operate in the location based on the verification, wherein the UE is in a radio resource control (RRC) connected state, transmit, to the UE for the satellite access, a message including a cause value for indicating that the location of the UE is not supported, and transmit, to the base station of the satellite access, a UE context release message including cause information for releasing the UE from the satellite access, wherein the cause information indicates that the releasing is due to the UE not being in a supported area, wherein the analytic information and the location information are associated with location services of the UE, and wherein a level of accuracy of the first information has a greater precision than a level of accuracy of the second information.

2. The AMF entity of claim 1, wherein the UE mobility analytics include UE location statistics and UE location predictions.

3. A method performed by an access and mobility management function (AMF) entity in a mobile communication system, the method comprising:

receiving, from a base station of a satellite access, a message indicating that a verification of a location of a user equipment (UE) for the satellite access is required, the message including first information on the location of the UE for the satellite access;

receiving, from a network data analytics function (NWDAF) entity, second information for verifying the location of the UE for the satellite access, wherein the second information includes analytic information aggregating UE mobility analytics generated by at least one NWDAF entity and location information estimated by a location management function (LMF) entity;

verifying the location of the UE based on the analytic information;

identifying that the UE is not allowed to operate in the location based on the verification, wherein the UE is in a radio resource control (RRC) connected state;

transmitting, to the UE for the satellite access, a message including a cause value for indicating that the location of the UE is not supported; and transmitting, to the base station of the satellite access, a UE context release message including cause information for releasing the UE from the satellite access, wherein the cause information indicates that the releasing is due to the UE not being in a supported area, wherein the analytic information and the location information are associated with location services of the UE, and wherein a level of accuracy of the first information has a greater precision than a level of accuracy of the second information.

4. The method of claim 3, wherein the UE mobility analytics include UE location statistics and UE location predictions.

* * * * *